US008732824B2

(12) United States Patent
Arbaugh et al.

(10) Patent No.: US 8,732,824 B2
(45) Date of Patent: May 20, 2014

(54) METHOD AND SYSTEM FOR MONITORING INTEGRITY OF RUNNING COMPUTER SYSTEM

(75) Inventors: William A. Arbaugh, Ellicott City, MD (US); Jeffrey D. Chung, Freemont, CA (US); Nick L. Petroni, Cherry Hill, NJ (US); Bryan Boot, Santa Clara, CA (US)

(73) Assignee: Microsoft Corporation, Redmond, WA (US)

(*) Notice: Subject to any disclaimer, the term of this patent is extended or adjusted under 35 U.S.C. 154(b) by 1532 days.

(21) Appl. No.: 11/656,453

(22) Filed: Jan. 23, 2007

(65) Prior Publication Data

US 2007/0261120 A1    Nov. 8, 2007

Related U.S. Application Data

(60) Provisional application No. 60/761,125, filed on Jan. 23, 2006, provisional application No. 60/794,685, filed on Apr. 25, 2006.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |

(52) U.S. Cl.
USPC ............................................. 726/22; 726/26

(58) Field of Classification Search
None
See application file for complete search history.

(56) References Cited

U.S. PATENT DOCUMENTS

| 5,294,093 A | * | 3/1994 | Huveteau et al. ............. 251/263 |
| 7,457,951 B1 | | 11/2008 | Proudler et al. |
| 7,577,991 B2 | * | 8/2009 | Huynh et al. ................... 726/22 |
| 2002/0029308 A1 | * | 3/2002 | Babaian et al. ............... 710/240 |
| 2003/0084337 A1 | * | 5/2003 | Simionescu et al. ........... 713/200 |
| 2006/0005188 A1 | * | 1/2006 | Vega et al. ........................ 718/1 |
| 2007/0006307 A1 | * | 1/2007 | Hahn et al. ...................... 726/22 |
| 2007/0067623 A1 | * | 3/2007 | Ward ............................. 713/164 |
| 2007/0073999 A1 | * | 3/2007 | Verheyen et al. ............... 712/11 |

OTHER PUBLICATIONS

Zhang et al., Secure Coprocessor-based Intrusion Detection, 2002, IBM T.J. Watson Research Center, pp. 1-4.*
Brumley, D., "Invisible Intruders: Rootkits in Practice," http://www.usenix.org/publications/login/1999-9/features/rootkits.html, 1999, 5 pages.
Jones, K., "Loadable Kernel Modules," http://www.usenix.org/publications/login/2001-11/pdfs/jones2.pdf, Nov. 2001, 8 pages.

(Continued)

*Primary Examiner* — Nadia Khoshnoodi
(74) *Attorney, Agent, or Firm* — Henry Gabryjelski; Kate Drakos; Micky Minhas

(57) ABSTRACT

Monitoring integrity of a running computer system is based on creating a Test Model which includes predicates descriptive of invariant properties of security relevant objects and their attributes in the monitored structure known-to-be "healthy", acquiring memory image of a portion of the running monitored structure, decomposing the acquired memory image to retrieve representation of the security relevant objects of interest, by implementing the attributes of the Test Model, and verifying, by implementing the predicates, whether the invariant properties defined in the Test Model remain unchanged for the running host system. If a discrepancy is detected, a signal indicative of a detected discrepancy is transmitted to a management entity for analysis and formulating a course of action.

25 Claims, 8 Drawing Sheets

(56) References Cited

OTHER PUBLICATIONS

Kim, G. et al., "The Design and Implementation of Tripwire: A File System Integrity Checker," Proc. of the Second ACM Conf. on Computer and Communications Security, Nov. 1994, pp. 18-29.

Molina, J., "Using Independent Auditors as Intrusion Detection Systems," Lecture Notes in Computer Science, vol. 2513, Proc. of the 4$^{th}$ International Conference on Information and Communications Security, 2002, pp. 291-302.

Nagle, D., "Design Tradeoffs for Software Managed-TLBs," ACM, 1993.

* cited by examiner

METHOD AND SYSTEM FOR MONITORING INTEGRITY OF RUNNING COMPUTER SYSTEM

The present utility patent application is based on a Provisional Patent Application Ser. No. 60/761,125 filed 23 Jan. 2006 and Provisional Patent Application Ser. No. 60/794,685 filed 25 Apr. 2006.

STATEMENT REGARDING FEDERALLY SPONSORED RESEARCH OR DEVELOPMENT

The development of the invention described herein was funded by the U.S. Government through contract number FA8750-05-C-0202 granted by the U.S. Air Force Research Laboratories (USAF, AFMC). The U.S. Government has certain rights in this invention.

FIELD OF THE INVENTION

The present invention is directed to computer information security, and in particular, to the monitoring of the integrity of a running computer system to detect unauthorized modifications to the system structures, such as, for example, operating systems, kernels, applications, domain manager, etc.

In overall concept, the present invention is directed to novel architecture for defining and monitoring semantic integrity constraints (invariant properties) associated with security relevant objects of the monitored systems. The system may rely upon an expert to describe the correct operation of the system via an abstract model for low-level security relevant data structures and the relationships between them.

The present invention is also directed to integrity monitoring architecture which is independent of the correctness of the monitored structure, such as, for example, the correctness of the monitored kernel, in order to detect a possible violation. The system relies on a trustworthy monitor that has direct access to the kernel memory, as well as other host resources, including processed state, filesystem, etc. on the protected system while being operationally isolated therefrom. In this manner, operation is maintained even when the host kernel has been thoroughly compromised. The independence of the host system integrity monitor from the "health" of the host's memory may be provided by locating the integrity monitor in a processor (physically or virtually) independent of the host processor.

The present invention is further directed to detecting integrity violations in dynamic kernel data structures by using high level security specifications defined for the host system that provides a simplified and accurate representation of how low-level security relevant objects in memory relate to one another, as well as being based on a set of predicates describing invariant properties that must remain unchanged for the specified data objects for the integrity of the kernel to remain intact.

BACKGROUND OF THE INVENTION

The ability of intruders to hide their presence in a compromised system has surpassed the ability of the current generation of integrity monitors to detect them. Once in control of a system, intruders modify the state of constantly-changing dynamic kernel data structures to hide their privileges.

The foundation of the Trusted Computing Base (TCB) (National Computer Security Center, *Department of Defense Trusted Computer System Evaluation Criteria*, December 1985) used on most currently deployed computer systems is an Operating System that is large, complex, and difficult to protect. Upon penetrating a system, sophisticated intruders often tamper with the Operating System's programs and data to hide their presence from legitimate administrators and provide backdoors for easy re-entry. The Operating System kernel itself is a favored target, since a kernel modified to serve the attacker renders user-mode security programs ineffective. Many so-called "rootkits" are now available to automate this tampering. Rootkits are collections of programs that enable attackers who have gained administrative control of a host to modify the host's software, usually causing it to hide their presence.

Recent advances in defensive technologies, such as external kernel integrity monitors (D. Hollingworth and T. Redmond, Enhancing operating system resistance to information warfare. In *MIL-COM* 2000. $21^{st}$ *Century Military Communications Conference Proceedings*, volume 2, pages 1037-1041, Los Angeles, Calif., USA, October 2000; X. Zhang, L. van Doorn, T. Jaeger, R. Perez, and R. Sailer, Secure Coprocessor-based Intrusion Detection. In *Proceedings of the Tenth ACM SIGOPS European Workshop*, Saint-Emilion, France, September 2002; N. L. Petroni, T. Fraser, J. Molina, and W. A. Arbaugh, Copilot—a Coprocessor-based Kernel Runtime Integrity Monitor. In $13^{th}$ *USENIX Security Symposium*, San Diego, Calif., August 2004) and code attestation/execution verification architectures (R. Kennell and L. H. Jamieson, Establishing the Genuinity of remote Computer Systems. In *Proceedings of the $12^{th}$ USENIX Security Symposium*, pages 295, 310, Washington, D.C., August 2003; A. Seshadri, A. Perrig, L. van Doorn, and P. Khosla; SWATT: SoftWare-based ATTestation for Embedded Devices. In *IEEE Symposium on Security and Privacy*, Oakland, Va., May 2004; A. Seshadri, M. Luk, E. Shi, A. Perrig, L. van Doorn, and P. Khosla, Pioneer: Verifying Code Integrity and Enforcing Untampered Code Execution on Legacy Systems. In *Proceedings of the $20^{th}$ ACM Symposium on Operating Systems Principles (SOSP)*, Brighton, United Kingdom, October 2005), have demonstrated their ability to detect the kinds of tampering historically performed by rootkits. However, rootkit technology has moved to a more sophisticated level. While these defensive technologies have focused on the relatively straightforward task of detecting tempering in static and unchanging regions of kernel text and data structures—typical targets of the previous generation of rootkits—the new rootkit generation has evolved to more sophisticated tampering behavior that targets dynamic parts of the kernel.

Seeking to avoid detection and subsequent removal from the system, intruders can hide their processes from legitimate administrators by modifying links in the Linux and Windows XP/2000 kernels' process tables. Due to the fact that the state of the process table changes continuously during kernel runtime, identifying these modified links is difficult for the current generation of kernel integrity monitoring tools that focus only on static data. Although this targeting of dynamic data was not entirely unanticipated by researchers (X. Zhang, L. van Doorn, T. Jaeger, R. Perez, and R. Sailer, Secure Coprocessor-based Intrusion Detection. In *Proceedings of the Tenth ACM SIGOPS European Workshop*, Saint-Emilion, France, September 2002), there has yet to be a general approach for dealing with this threat. In order to be effective against the latest rootkit technology, defensive mechanisms must consider both static and dynamic kernel data since changes in either can lead to the compromise of the whole.

The current monitoring tools disadvantageously rely upon the correctness of the monitored kernel in order to detect an intrusion, which often is an invalid assumption. After gaining full administrative control of a system, such intruders may modify some of the kernel's dynamic data structures to their advantage. For example, in a GNU/Linux system, an intruder may remove tasks from the Linux kernel's all-tasks list in order to hide them from the system's legitimate administrators.

Alternatively an intruder may modify an entry in the Linux kernel's SELinux access vector cache to temporarily elevate their privileges and disable auditing without making visible changes to the SELinux policy configuration. Neither of these techniques expose flaws in the Linux kernel or its SELinux security module. These examples represent the potential acts of an intruder who has already gained full control of the system—perhaps by exploiting the trust or carelessness of the system's human operators in a manner entirely outside the scope of the system's technological safeguards.

Rootkits have evolved beyond the historical methods of hiding processes which included modifying the text of the ps program to mislead legitimate administrators or causing the kernel itself to "lie" by replacing the normally-static values of kernel text or function pointers. This is exemplified by system call vector or jump tables in the /proc filesystem with addresses of malicious functions. Even the most sophisticated threats became easy to detect by monitors that could compare the modified values against a known-proper value. In a "healthy" system, these values should never change.

However, attackers do not need to modify kernel code to hide processes within a running kernel. In fact, they do not have to rely on manipulating the control flow of the kernel in any way. Instead, adversaries have found techniques to hide their processes even from correct, unmodified kernel code. By directly manipulating the underlying data structures used for process accounting, an attacker can quickly and effectively remove any desired process from the view of standard, unmodified administrator tools. While the process remains hidden for accounting purposes, it continues to execute as normal and will remain unaffected from the perspective of the scheduler. To understand how this state is achieved, a brief overview of Linux 2.6 process management is provided in the following paragraphs.

The primary data structure for process management in the Linux kernel is the task_struct structure (R. Love, *Linux Kernel Development*. Novell Press, Second edition, 2005). All threads are represented by a task_struct instance within the kernel. A single-threaded process will therefore be represented internally by exactly one task_struct. Since scheduling occurs on a per-thread basis, a multi-threaded process is simply a set of task_struct objects that share certain resources such as memory regions and open files, as well as a few other properties including a common process identifier (PID), which is a unique number given to each running process on the system.

In a correctly-running system, all task_struct objects are connected in a complex set of linked lists that represent various groupings relevant to that task at a particular time. For accounting purposes, all tasks are members of a single doubly-linked list, identified by the task_struct.tasks member. This list, which is referred to as the all-tasks list, insures that any kernel function needing access to all tasks can easily traverse the list and be sure to encounter each task exactly once. The head of the task list is the swapper process (PID 0), identified by the static symbol init_task. In order to support efficient lookup based on PID, the kernel also maintains a hash table that is keyed by PID and whose members are hash-list nodes located in the task_struct.pid structure. Only one thread per matching hash of the PID is a member of the hash table; the rest are linked in a list as part of task_struct.pid member. Other list memberships include "parent/child" and "sibling" relationships and a set of scheduler-related lists.

Scheduling in the Linux kernel is also governed by a set of lists. Each task exists in exactly one state. For example, a task may be actively running on the processor, waiting to be run on the processor, waiting for some other event to occur (such as I/O), or waiting to be cleaned up by a "parent" process. Depending on the state of a task, that task will be a member of at least one scheduling list somewhere in the kernel. At any given time, a typical active task will either be a member of one of the many wait queues spread throughout the kernel or a member of a per-processor run queue. Tasks cannot be on both a wait queue and a run queue at the same time.

Primed with this knowledge of the internals of Linux process management, a trivial technique by which an attacker can gain the ultimate stealth for a running process is described in the following paragraphs.

FIG. 1 depicts the primary step of the attack: removing the process from the doubly-linked all-tasks list (indicated by the solid line 10 between tasks). Since this list is used for all process accounting functions, such as the readdir( ) call in the /proc filesystem, removal from this list provides all of the stealth needed by an adversary. For an attacker who has already gained access to kernel memory, making this modification is as simple as modifying two pointers per hidden process. As a secondary step to the attack, adversaries might also choose to remove their processes from the PID hash table (not shown) in order to prevent the receipt of unwanted signals.

As shown in FIG. 1, a task not present in the all-tasks list can continue to function because the set of lists used for scheduling is disjoint from the set used for accounting. The dashed line 12 shows the relationship between objects relevant to a particular processor's run queue, including tasks that are waiting to be run (or are currently running) on that processor. Even though the second depicted task is no longer present in the all-tasks list, it continues to be scheduled by the kernel. Two simple changes to dynamic data therefore result in perfect stealth for the attacker without the necessity of modification to static data or kernel text.

When most actions occur in the kernel, some form of a capability is used to identify whether or not a principal should be given (or already has been given) access to a resource. These capabilities therefore represent a prime target for attackers wishing to elevate privilege. Changing process users identifiers (UIDs) has long been a favorite technique of attackers. Other examples include file descriptors and sockets (both implemented in the same abstraction in the kernel).

The SELinux access vector cache (AVC) provides a good example of this kind of capability and represents a potential target for an adversary seeking privilege escalation.

SELinux (P. A. Loscocco and S. D. Smalley, Integrating Flexible Support for Security Policies into the Linux Operating System. In *Proceedings of the FREENIX Track: 2001 USENIX Annual Technical conference*, Boston, Mass., June 2001) is a security module for Linux kernels that implements a combination of type Enforcement (W. E. Boebert and R. Y. Kain, A Practical Alternative to Hierarchical Integrity Policies. In *Proceedings of the 8th National Computer Security Conference*, pages 18-27, Gaithersburg, Md., September 1985) and Role-based (D. Ferraiolo and R. Kuhn, Role-Based Access Controls. In *Proceedings of the 15th National Computer Security Conference*, pages 554-563, Baltimore, Md., October 1992) mandatory access control, now included in some popular GNU/Linux distributions. During runtime, SELinux is responsible for enforcing numerous rules governing the behavior of processes. For example, one rule might state that the DHCP (R. Droms, Dynamic host configuration protocol. Technical report RFC 2131, Bucknell University, March 1997) client daemon can only write to those system configuration files needed to configure the network and the Domain Name Service, but no others. By enforcing this rule, SELinux can limit the damage that a misbehaving DHCP client daemon might cause to the system's configuration files should it be compromised by an adversary (perhaps due to a buffer overflow or other flaw).

To enforce its rules, SELinux must make numerous decisions during runtime such as "Does the SELinux configuration permit this process to write this file?" or "Does it permit process A to execute program B?" Answering these questions involves some overhead. Thus SELinux includes a component called the access vector cache (AVC) to save these answers. Whenever possible, SELinux rapidly retrieves answers from the AVC, resorting to the slower method of consulting the policy configuration only on AVC misses.

SELinux divides all resources on a system (such as processes and files) into distinct classes and gives each class a numeric Security Identifier or "SID." It expresses its mandatory access rules in terms of what processes, with a particular SID, may and may not do to resources with another SID. Consequently, at a somewhat simplified abstract level, AVD entries take the form to tuples:

<ssid, tsid, class, allowed, decided, audit-allow, audit-deny>

The ssid field is the SID of the process taking action, the tsid field is the SID of the resource the process wishes to act upon, and the class field indicates the kind of resource (file, socket, etc.). The allowed field is a bit vector indicating which actions (read, write, etc.) should be allowed and which should be denied. Only some of the allowed field bits may be valid. As an example, if the previous questions answered by SELinux have involved only the lowest-order bit, then that may be the only bit that contains a meaningful 0 or 1. SELinux may or may not fill in the other allowed field bits until a question concerning those bits is provided. To distinguish a 0 bit indicating "deny" from a 0 bit indicating "invalid," the decided field contains a bit vector with 1 bits for all valid positions in the allowed field. The audit-allow and audit-deny fields are also bit vectors; they contain 1 bits for operations that should be logged to the system logger when respectively allowed or denied.

It is conceivable that adversaries who have already gained administrative control over a system might wish to modify the SELinux configuration to give their processes elevated privileges. They could accomplish this most directly by modifying the SELinux configuration files, but such modifications would be easily detected by filesystem integrity monitors like Tripwire (G. H. Kim and E. H. Spafford, The Design and Implementation of Tripwire: a File system Integrity Checker. In *Proceedings of the 2nd ACM Conference on Computer and Communications Security*, pages 18-29, Fairfax, Va., November 1994).

Alternately, they might modify the in-kernel data structures representing the SELinux configuration which is the same data structures SELinux consults to service an AVC miss. However, these data structures change infrequently, when administrators decide to modify their SELinux configuration during runtime. Consequently, any tampering may be discovered by a traditional kernel integrity monitor that performs hashing or makes comparisons with correct, known-good values.

The state of the AVC, on the other hand, is dynamic and difficult to predict at system configuration time. Entries come and go with the changing behavior of processes. An adversary might insert a new AVC entry or modify an old one to effectively add a new rule to the SELinux configuration. Such an entry might add extra allowed and decided field bits to grant additional privileges, or remove existing audit-allow and audit-deny field bits to run off troublesome logging. Such an entry would override the proper in-memory and on-disk SELinux configuration for as long as it remained in the cache.

Current monitoring tools are limited to detecting changes in nominally static kernel data and text and cannot distinguish a valid state change from tampering in these dynamic data structures. The methods, which can be characterized by calculating hashes of static kernel data and text and comparing the result to known-good values, are not applicable to the continuously changing dynamic data structures now being targeted by rootkits.

It is therefore a growing need in the information security area to for an advanced defensive mechanism capable of detection of integrity violations of both static and dynamic kernel data and which is independent of the correctness of a monitored host system.

SUMMARY OF THE INVENTION

It is therefore an object of the present invention to provide a specification-based integrity defense mechanism for monitoring the integrity of a running host system which is capable of detecting modification both in static and dynamic memory structures.

It is another object of the present invention to provide a comprehensive monitor for host system integrity check which employs a set of representations of invariant properties of security relevant objects of the monitored structure built for a "known-to-be-healthy" host system and applied to the host system during runtime to check whether the invariant properties remain unchanged. Modifications detected for the checked invariant properties are indicative of possible intrusion and are further analyzed.

It is a further object of the present invention to provide a monitoring system for monitoring the integrity of a running host system which relies upon a description of the correct operation of the host system via an abstract model for low-level data structures and the relationships between them. The abstract model contains predicates, which represent security relevant data structures in the monitoring system and their properties or interrelationships that must remain unchanged at runtime in order for the system to remain "healthy". The predicates also control the verification strategy for the invariant properties of the security relevant objects of the monitored structures.

It is also an object of the present invention to provide a method and system which is independent from the correctness of the monitored structure as it relies upon a trustworthy monitor that has direct access to the monitored structure of the protected system while being operationally protected therefrom.

The present method for monitoring the integrity of the running host computer system comprises the steps of:

providing a direct access for a monitor unit to a monitored structure of a running host computer system, loading a Test Model to the monitor unit which includes predicates representing description of an invariant property of security relevant objects of the monitored structure, as well as attributes of the security relevant objects, such as for example addresses thereof, acquiring, at the monitor unit, a memory image of a portion of the monitored structure, decomposing, under the control of the Test Model, the acquired memory image to extract a representation of the security relevant object, and verifying, by implementing predicates of the Test Model, whether the invariant properties of the security relevant objects remain unchanged.

If this is the case, the running host computer system is considered "healthy". However, in the case when a modification to the invariant property has been detected, a signal is issued indicative of a modification to the monitored structure. The issued signal is transmitted to a management system through an independent communication channel extending between the monitor unit and the management station for analysis of the detected abnormality and further for establishing a course of action.

The monitor unit of the present concept is capable of monitoring, independently of the correctness of the monitored structure, which may include the main memory, operating system, kernel, static kernel memory, semi-static kernel data, dynamic kernel data, applications system, domain manager system, etc. of the host computer system.

The memory image can be acquired by the monitor unit and the Test Model can be executed either periodically or at randomized time intervals.

The Test Model is created at the management station, either automatically or by a human expert. Creation of the Test Model generally includes the following steps:

examining a configuration of the monitored structure of the host computer system to identify security relevant objects and to define their attributes such as for example addresses thereof, defining invariant properties for the security relevant objects such as objects values and/or relationship therebetween which remain unchanged in the running host computer system if it is problem free.

The Test Model is formed of the predicates and the attributes of the security relevant objects to be checked. Additionally, the Test Model includes a set of directions to the monitor unit to actuate a predetermined action when a predetermined condition exists, such as for example to instruct the monitor unit to scan the monitored memory structure periodically in a specified time interval period, or to avoid duplicate errors to be sent to the management station, etc. The predicate uses previously built libraries to assist in the decomposition of the memory image into security relevant objects and is implemented to verify the invariant property of interest.

In the method of the present concept, the monitor unit serves as an evaluation engine designed to acquire a memory image and processor state for the purpose of monitoring scalar and semantic invariance within the operation system or applications. The acquired image is decomposed into its relevant object through the application of a memory model which is a part of the Test Model and which includes the attributes of the security relevant objects. The semantic and scalar integrity of the monitored structure is then verified through the assertion of predicates which constitute the semantic model of the Test Model.

In the present method, the monitoring unit may reside in any of a co-processor board, a chipset on the motherboard, or in a virtualized and para-virtualized CPU environment, including virtual co-processors created on the "fly", e.g., after booting, or when a virtualization layer (Domain Manager) spawns a virtualized partition. Alternatively, an existing virtual co-processor may spawn another virtual co-processor.

The present concept also constitutes a system for monitoring the integrity of a running host computer system which comprises at least one monitor unit having a direct access to the monitored structure of the running host computer system and operating independently therefrom, and a Test Model which includes a memory model and a semantic model, e.g., attributes of the security relevant objects to be checked and description of the invariant properties of these objects which must remain unmodified during the operation of the "healthy" host system. The Test Model is created offline preferably at the management station, and is loaded into the monitor unit to be executed therein.

The monitor unit includes:

a low-level monitor having a direct access to the monitored structure and acquiring from it a memory image of at least a portion of the monitored structure, and a decomposer unit coupled to the low-level monitor to extract from the memory image a representation of the security relevant objects as dictated by the memory model of the Test Model.

The monitor unit further includes a predicate verifier unit connected to the decomposer unit to receive therefrom data representative of the security relevant objects and inspecting the same to verify whether the invariant property associated with them remains unchanged.

A response mechanism unit is included into the monitor unit to receive a signal from the predicate verifier indicative of a modification to the invariant property when detected.

The monitoring system may include a plurality of monitor units as well as a plurality of management entities interconnected to provide monitoring of a plurality of host systems.

The management entity includes a policy and constraints definition unit, a model definition unit containing predicates representing invariant properties of the security relevant objects to be verified, a specification unit coupled to the policy and constraints definition unit and the model definition unit forming a test specification, and a configuration examining unit for examining a configuration of the monitored structure. A specification compiler is coupled to the configuration examining unit and specification unit to generate the compiled specification constituting the Test Model to be loaded into the monitor unit for being executed therein.

These features and the advantages of the present concept will become apparent after reading the further description of the preferred embodiment in conjunction with the patent drawings.

DESCRIPTION OF THE PREFERRED EMBODIMENTS

The present method and system for monitoring the state of a running information system (host computer system) uses a scripting engine to evaluate logic describing the correct state of the running system. This logic, also referred to herein as predicates, remains invariant when the system is in a correct state. Any change in the predicates value indicates a potentially unauthorized change to the system.

In the present invention, the malicious modifications of monitored structures are detected by comparing actual observed states with a specification of correct states of the security relevant objects of the monitored structure. Although, being applicable to a variety of monitored structures, including main memory, operating systems, kernel applications system, domain manager systems, etc., for the purpose of exemplifying and not to limit the scope of protection, further description will refer to the kernel memory. The specification of correct kernel state describes possible correct kernel states (not signatures of known attacks). In this manner, the present philosophy is based on specification for detection of a possible intrusion. This is a novel approach which is different from traditional signature-based virus scanners.

For detecting semantic integrity violations in dynamic kernel data structures, a high level security specification is defined for kernel data that provides a simplified and accurate representation of how kernel objects in memory relate one to another, as well as a set of predicates that remain unchanged for the kernel data object if the integrity of the kernel remains intact. The result of such an approach is a methodology that permits experts to concentrate on high-level concepts such as identifying security-relevant predicates, rather than writing low-level code to parse kernel data structures.

The monitor engine of the present concept evaluates functions written in a language that is either evaluated or compiled. The monitor engine has access to the low level state (registers, virtue and physical memory, and the scale system) of the running operating system. Given access to this primitives, a predicate developer determines what portions of the operating system or process are important. The reason for the importance is immaterial to the monitor engine, and may be for security, forensic, digital writes management, compliance checking, etc.

Figure 1:
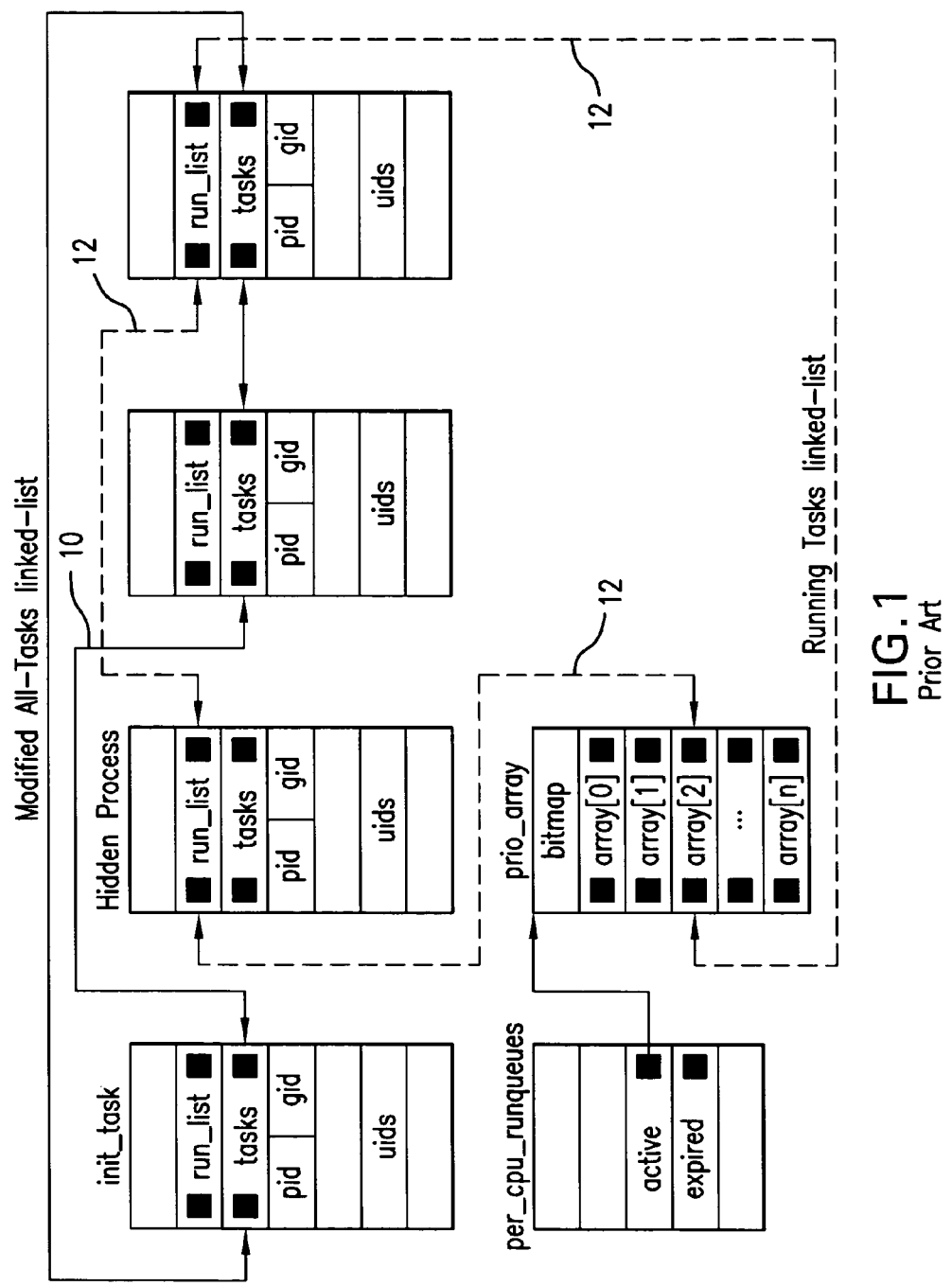
FIG. 1 is a schematic representation of a technique for removing the process from the doubly-linked all-tasks list by which an attacker may gain the ultimate stealth for a running process.

The predicate developer then codes the logic into a predicate which is evaluated whenever asked by the monitor engine. For example, for a common attack technique for hiding a process from detection on Windows and Linus by removing a process entry from the process list, but leaving the process' threads in the thread list, as shown in FIG. 1, once the deletion is completed, threads will continue to be executed since the scheduler uses the thread list. However, the threads will be invisible since all of the management and operating system tools examine the process list.

A simple predicate to identify hidden processes then would be to insure that all threads have a corresponding process entry in the process list. This predicate remains true until such time as there is a hidden process. Thus, the predicate is invariant when the system is unmodified. This provides a significant difference when compared to prior integrity monitoring techniques which focus solely on scalar bitwise invariance. In the present approach, which is referred to herein as a semantic integrity, the predicates remain invariant for a "healthy" operating system.

Figure 2:
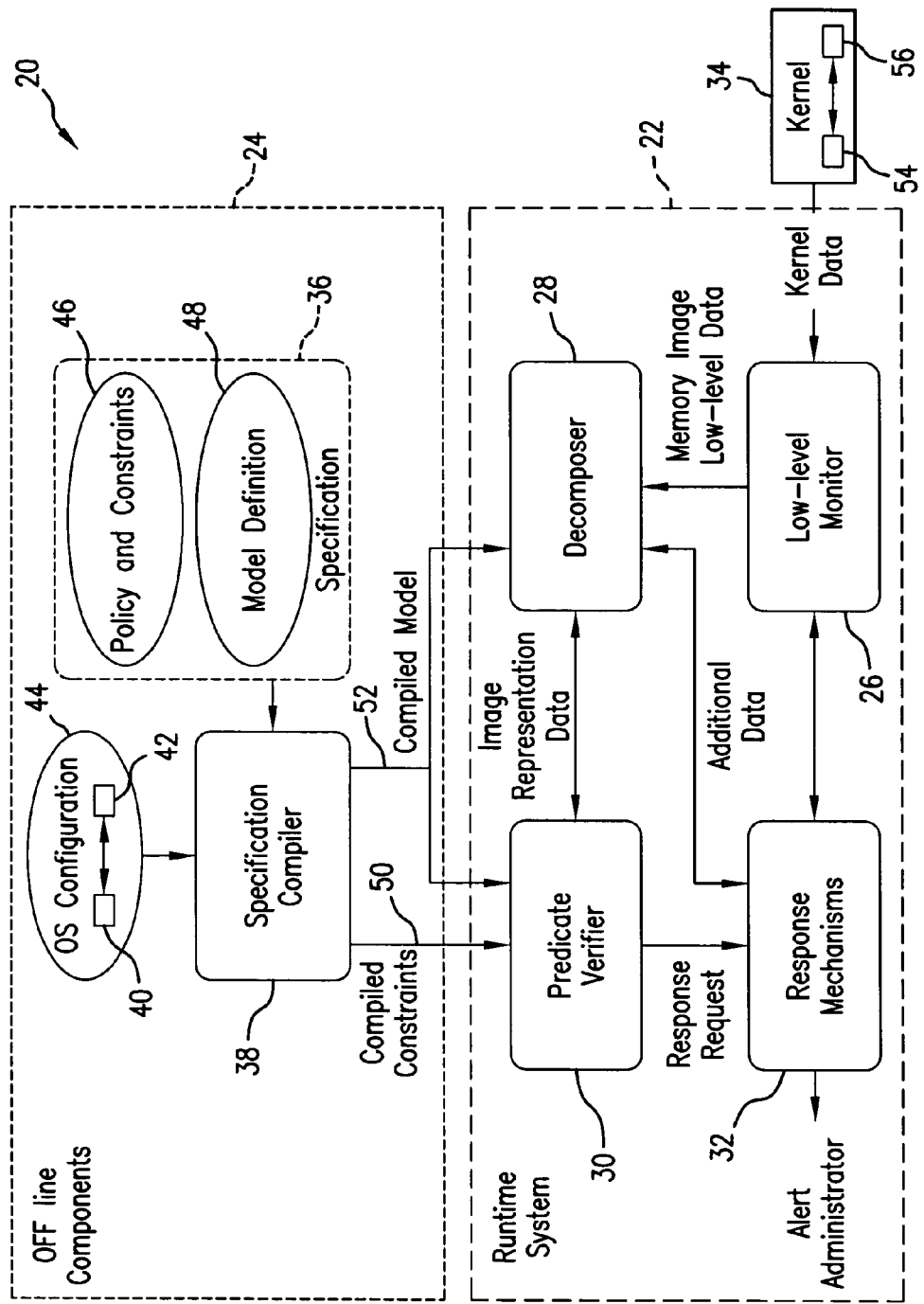
FIG. 2 is a schematic representation of the semantic integrity monitor architecture of the present invention.

Referring to FIG. 2, the monitoring system 20 of the present invention includes a runtime system 22 and offline components system 24. The monitoring system 20 shown in FIG. 2 which operates in accordance with the flow chart diagrams shown in FIGS. 3 and 4, monitors the integrity of the host memory and host system's utilities and resources in the memory, such as operating systems, applications, domain manager, etc. For exemplary purposes and without limiting the scope of the novel concept, the description refers to monitoring the kernel of the host's operating system. However, it will be readily apparent to those skilled in the art that other host's systems utilities and resources, as well as bus devices, may be effectively monitored, as taught in the present concept discussion.

The runtime system 22 includes a low-level monitor 26, a decomposer 28, a predicate verifier 30, and a response mechanisms unit 32 that work in conjunction to assess the integrity of a running kernel 34 based on the input specification 36. The specification 36 may be developed by a human specification developer or automatically and, as defined, provides a simplified but accurate representation of the values of the security relevant kernel objects in memory or of the relationships between them. As defined, the specification contains a set of predicates that must remain unchanged on the kernel objects for the integrity of the kernel to remain intact.

A specification compiler 38 is an offline component used at the time of the system setup or when specification updates are required. The compiler 38 translates text written in a computer language (the source language) into a lower level language. The specification compiler 38 receives the input information, e.g. a representation of how kernel security relevant objects 40 and 42 relate one to another in the operating system configuration 44.

Additionally, the specification compiler 38 receives representation of the specification 36 including Model Definition (predicates) 48 and policy and Constraints 46 from the specification unit 36 in order to generate a compiled specification. Constraints represent invariant properties of the security relevant objects of interest, such as, for example, objects values or relationships therebetween, which must remain unchanged for the healthy running host system. Policy is a set of rules/directions to take actions when certain conditions exist. For example, (setq time.scan.kme 10) would be a policy statement to instruct the monitor 22 to scan every 10 seconds.

Another example of the policy statement would be:
(if (not (eq last.sent.alert.kme current.alert.kme))
(alert.send.kme current.alert.kme))

This policy statement ensures that duplicate errors are not sent to a management station.

The low-level monitor 26 is an entity that provides access to the kernel memory 34 at runtime. While there are a number of possible implementations of the low-level monitor, the primary requirement is a consistent access to all of the kernel virtual memory 34, without reliance on the correctness of the protected kernel.

The decomposer 28 is responsible for taking raw data from the low-level monitor 26 and turning that data into the model abstraction as defined by the Test Model, which is loaded into the monitor unit 22 from the unit 24 and which includes a Compiled Constraints model 50 (implemented via predicates to verify the invariant properties of interest) and Compiled Model 52 (which is a memory model derived from the OS configuration libraries). The Memory Model 52 is input in the Decomposer 28 to assist in decomposition of the memory image acquired from the kernel 34. Effectively, the decomposer 28 serves as the bridge between the security relevant objects 54, 56 in the running kernel memory 34 and the abstract objects 40, 42 defined by a user from the OS configuration 44.

As described above, the goal of the monitoring system 20 is to apply high-level predicates to an abstract model of kernel data. The predicate verifier 30 operates on objects (image representation data) 54, 56 provided by the decomposer 28 to determine if the predicates 50, identified by the specification 36 are met.

The primary logic of the monitor system 20 is driven by the predicate verifier 30, which iterates through all predicates to verify them in order. To facilitate the verification of each predicate, the verifier 30 requests a consistent subset of the Image Representation Data form the decomposer 28 which either has the information readily available or uses the low-level monitor 26 to re-build that portion of the image representation (model). If a predicate passes, the verifier simply continues to the next. Failed predicates cause the verifier to dispatch a response mechanism according to the specification.

When a predicate is violated, there is a security concern within the system 20. Depending on the nature of the violated predicate, an administrator may wish to take actions varying from logging an error to notifying an administrator or even shutting down the system. The predicate verifier 30 is aware of the available response mechanisms 32 and initiates those mechanisms according to the response determined by the specification.

At a high level, predicates are the underlying logic that determine whether or not the kernel is secure with regard to integrity. Predicates are therefore expressions reflecting invariant relationships among kernel security relevant objects represented in the Test Model (specification). Conceptually, predicates can be divided into two classes: (1) those that are inherent to the correct operation of the system; and (2) those that represent site-specific policy.

For example, the hidden process example described in previous paragraphs, illustrated in FIG. 1, is clearly a violation of kernel integrity in a running kernel. However, in order to avoid reliance on the "correctness" of the kernel, it is possible to envision a set of external predicates on kernel data objects that do not relate explicitly to the "correct" operation of the kernel as it was designed by kernel developers, but rather to conditions that an administrator has deemed should never occur on that machine.

One example of such a predicate would be a requirement that no shell processes have user ID zero (root). The requirements for a good predicate language include simple expression of properties of the underlying model, an ability to specify conditions under which a predicate must hold, and a mechanism for assigning a response to any violated predicate. To match the choice of initial modeling language, for example, Demsky and Rinard's predicate language can be adapted to meet the needs of the present invention (B. Demsky and M. Rinard, Automatic Detection and Repair of Errors in Data Structures. In *Proceedings of the 18th Annual ACM SIGPLAN Conference on Object-Oriented Programming, Systems, Languages, and Applications (OOPSLA)*, Anaheim, Calif., October 2003).

Similar to the model specification, the predicates that must hold for a system may change when kernel developers make changes. However, much like model specifications, predicates can be distributed for use at any deployment where a given model is valid.

The language that predicates are written in is immaterial. The main point is that the predicate must return a true or false value. A predicate may also return additional information along with its Boolean value.

There are two types of predicates: snapshot, and semantic. Snapshot predicates are similar to traditional integrity methods that compare a previously computed value to a current value. Snapshot predicates require that state be saved in between invocations of the predicate by the monitor. This is in contrast to semantic predicates which require no state between invocations. The hidden thread detection predicate is an example of a semantic predicate.

An example of another semantic predicate is to determine if the monitored host remains alive, i.e. still executing instructions and not "sitting" in a crashed state. A predicate to determine the liveness of a monitored system is shown below:

```
(setq persist.predicate_description "Windows Liveness Check")
(setq persist.predicate_author "Komoku Inc.")
(setq persist.predicate_version "1.0")
(setq persist.predicate_status "")
(setq persist.predicate_summary "")
(defun findKeTickCount ( )
    (let ((symbol_table gamma_global ["kernel_module"].symbol_table))
        (return symbol_table[keTickCount])))
(defun readTickCount (vaddr)
    (let ((TickCount nil))
        (if (not (eql vaddr nil))
            ((setq TickCount _gl_x86_vm_read_integer_32 (vaddr))))
        (return TickCount))
(defun isMachineAlive ( )
    (let ((KeTickCount findKeTickCount( ))
        (TickCount readTickCount (keTickCount))
        (GIVEUP 999999))
        (while (not (eql TickCount readTickCount (keTickCount)))
            (setq GIVEUP (sub GIVEUP 1))
            (if (leq GIVEUP 0)
                (return false))
            (sleep 1))
        (return true))
(if (eql isMachineAlive ( ) true)
    ((setq persist.predicate_status "PASS")
    (setq persist.predicate_summary "Monitored host is running")
    (gamma-log "x86-win32-liveness - scan complete [PASS - monitored host is running"))
    ((setq persist.predicate_status "FAIL")
    (setq persist.predicate_summary "Monitored host is NOT running")
    (gamma-log "x86-win32-liveness - scan complete [FAIL - monitored host is NOT running")))
```

How the monitor unit 22 actually accesses the state of the information can vary, as will be described in further paragraphs. As an example, in a high assurance approach, the low-level monitor 26 will be isolated and independent of the host kernel 34 which is being monitored. Whereas in a low assurance approach, the monitor can run as a privileged process or driver on the system it is monitoring. This approach can obviously be tampered with by an intruder. An example of the former is the host monitor shown in FIG. 5 and an example of the second is a software prototype shown in FIG. 8 (described in further paragraphs).

For example, assuming that the monitor is the lisp eval function augmented by access to the monitored host's state, then a predicate to determine if a particular memory location was a specific value may be written as:

```
(defun check-memory-p (vaddr1 vaddr2)
    (if (eql (_gl_x86_vm_read_integer_32 vaddr) vaddr2)
        (return T)
```

```
        (return nil)
        )
)
(defun memory-eql-deadbeef( )
        (return (check memory-p 0x3900 0xdeadbeef))
)
```

The functions above would be sent to the evaluation function, or monitor 22, on an as needed basis or at regular time intervals set by the user. An example of such a monitor call would be simply (eval 'memory-eql-deadbeef).

In the above example, a simple predicate is shown using a helper function that provides access to the state of the running system. The monitor unit 22 can be made more generic by accepting input of any well formed predicate(s) and helper functions until such time as the monitor itself is terminated (if ever).

The monitor 22 is coupled with an appropriate communications capability so that the monitor can "attest" to its results via a logging process that uses the network, file system, or graphics sub-system. These sub-systems may be part of the monitored host in a low assurance solution. Alternatively, they can be part of a specialized monitor to maintain independence and separation from the monitored host. In this example, the function sml_log serves as a means to communicate the results of the predicate, and the assignments to persistent variables and allows the state of the monitor to be shared across different predicates.

An advantage of this communications is that the monitor, when combined with the appropriate cryptographic means, can locally and remotely attest as to the running configuration of the monitored host 34.

The monitor combined with communications can support a variety of applications such as malicious code detection, digital rights management, compliance checking by auditors, and forensic collection and analysis. The programmable nature of the monitor combined with its access to the host's state allows predicate developers complete freedom in determining their checks and attestations.

Two example specifications for the system 20 have been described herein and the types of modifications that these specifications can detect are identified. While the examples in previous paragraphs are useful for demonstrating how the proposed system works, they provide little intuition about how specifications would be developed in a real deployment. In the following paragraphs, a high-level methodology is described for identifying system properties of interest and three classes of threats which have been identified.

Currently, there are two methods for identifying data properties and writing their corresponding specifications: (1) analyzing and abstracting on known threats and (2) deriving data properties and specifications from a high-level English-language security policy.

In the analysis of known threats, the goal is to classify the techniques used by adversaries in previous attacks in order to abstract on these methodologies. The result is the identification of a set of data invariants that may be violated by future attacks. This approach permits the possibility that new attacks may avoid detection by exploiting only those details of the kernel abstracted out of the specification, leading to an interminable "arms race" between attackers and specification-writers. Nevertheless, this approach is still an improvement over the traditional signature-based virus-scanning approach in that each specification has the potential to detect an entire class of similar attacks rather than only a single instance.

It may be possible to avoid such an "arms race" by using the approach of the present invention: deriving specifications from a high-level English-language security policy rather than from an analysis of known attacks. In this approach, an analyst may begin with a policy such as "no runnable processes shall be hidden" or "my reference monitor enforces my particular mandatory access control policy" and then examine the kernel source to determine which data structures have relevant properties and what those properties should be in order for the high-level policy to hold. The analyst's task is similar to constructing a formal argument for correctness with the exception that the end result is a configuration for a runtime monitor.

The analyst's task may be similar to constructing an assurance argument, except that the end result would be a configuration for a runtime monitor rather than a formal argument for correctness.

To the degree possible, the system has to be able to detect modifications performed by "new" threats that were unknown at the time of system deployment. However, one clear challenge facing a specification-based detection system is the ability of identifying a set of properties that may be violated by future threats and writing a specification that is complete enough to express those properties.

In the worst case, a scenario a scenario may be envisioned where each new attack reveals some novel modification that were previously unpredictable. This scenario is alarmingly analogous to the current state of misuse detection systems, which require frequent updates in order to keep up with the latest set of attacks. For the system 20 of the present invention the question of whether a "complete" specification can be written for all relevant data invariants remains open. However, as it will be discussed further the analysis indicates that at worst the system will be limited to detecting "classes" of attacks rather than specific instances of known attacks. It is believed that identification of these classes will result in specifications that can detect a large number of unknown threats.

There are two methods for identifying data properties and writing their corresponding specifications: analyzing and abstracting on known threats and examining the target kernel for security-critical subsystems. In the first method, analysis of known threats, the goal is to classify the techniques used by adversaries in previous attacks in order to abstract on these methodologies. The result is the identification of a set of data invariants that may be violated by future attacks. An example of the usefulness of this technique is found in the "control flow modification" class of attacks, described below. By analyzing a small number of existing rootkits, an entire class of specification rules has been identified for detecting potential threats that modify dynamic function pointers to change the kernel's execution path.

The second method for extracting data properties is to have a human expert analyze kernel subsystems and identify security-critical data properties. An experimental system has been developed to use SELinix technique to identify security critical subsystems. In this experimental system, the access vector cache (AVC) is configured to begin evicting least frequently used entries after reaching a threshold of 512 entries. The developed single-user system has generally never loaded the AVC much beyond half of this threshold—although it is occasionally busy performing builds, these builds tended to pose the same small number of access control questions repetitively. However, it may be imagined that a more complex multi-user system may cause particular AVC entries to appear and disappear over time Installations that permit SELinux configuration changes during runtime may also experience AVC entries evicted due to revocation of privileges.

Once the "capability modification" class of data modification attacks, discussed below has been identified, it is recognized that consistency between the SELinux AVC and the base policy is an invariant worth checking. It should be noted that this specification was not identified based on any existing attack but rather based on knowledge of the kernel itself.

Figure 3:
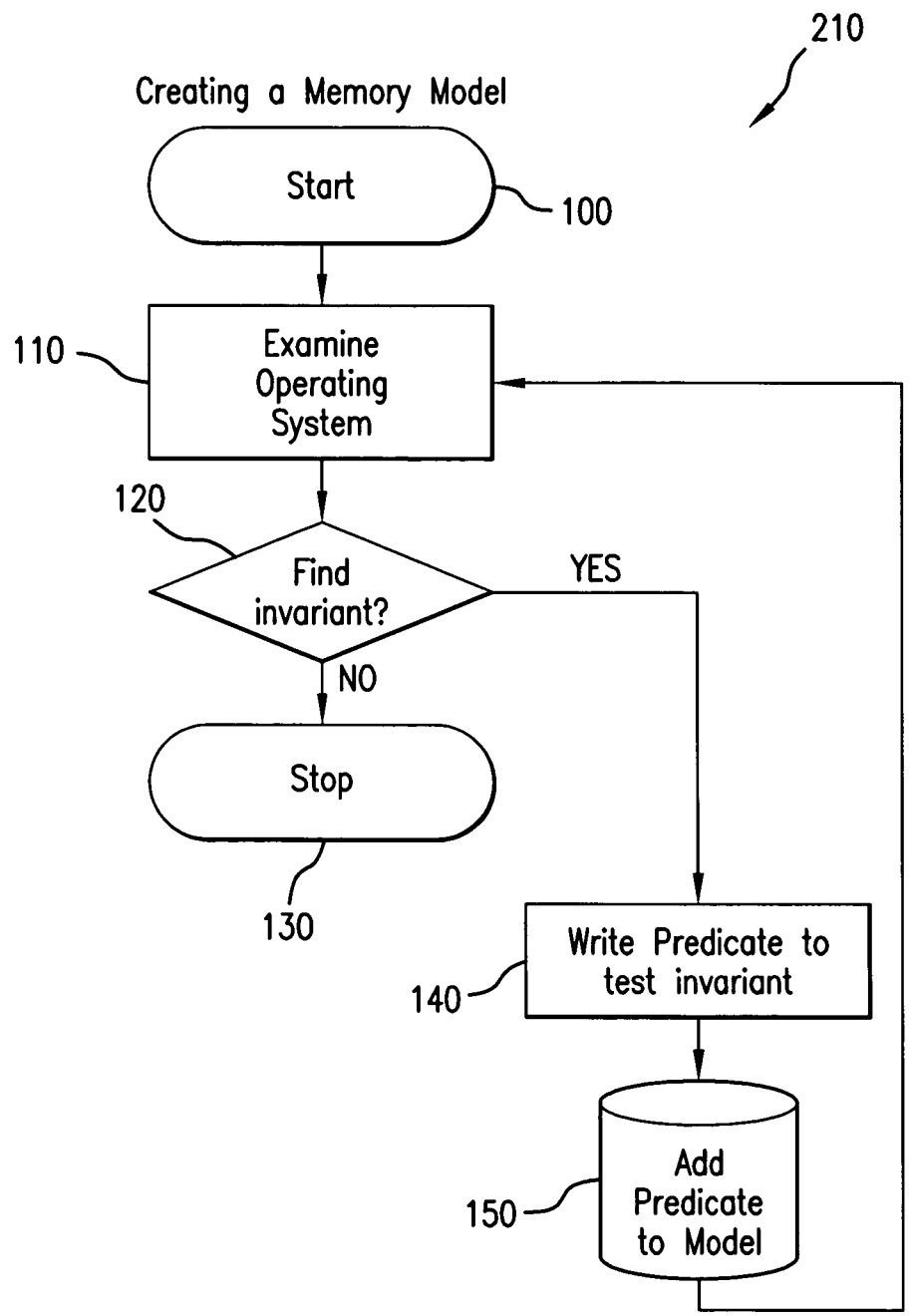
FIG. 3 is a flow chart diagram representing a subroutine for creating a Test Model.
Figure 4:
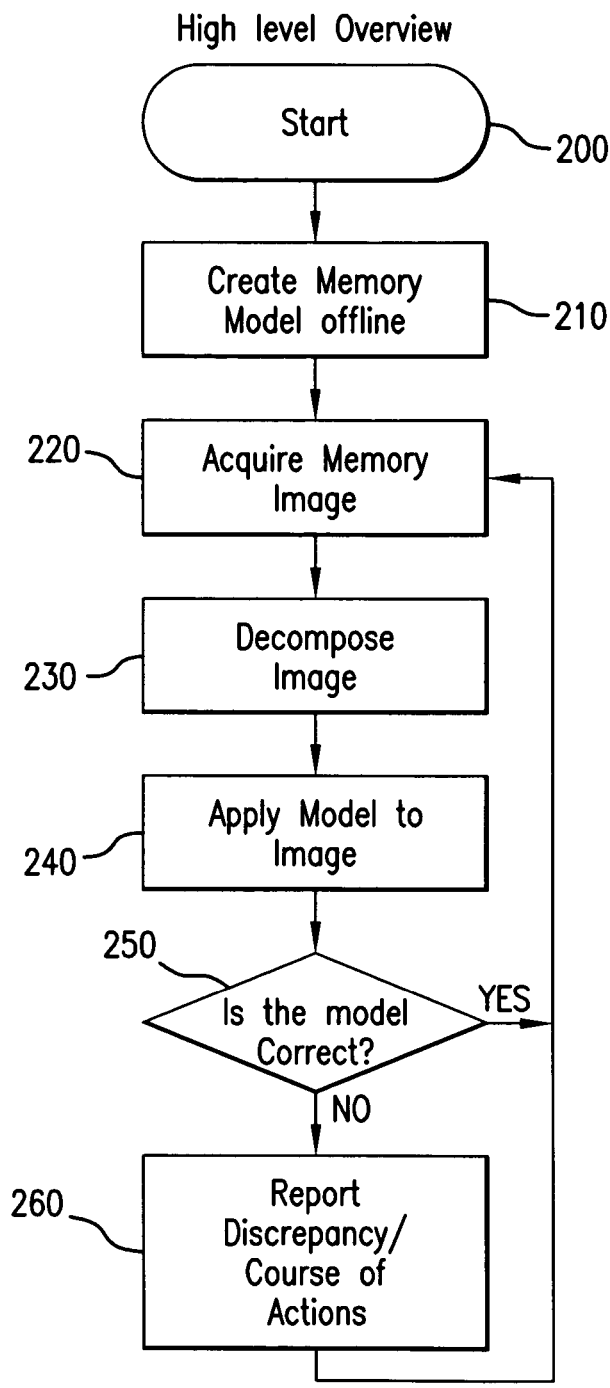
FIG. 4 is a flow chart diagram of the process of the present invention for monitoring integrity of the running host system.

FIGS. 3 and 4 represent a flow chart diagram of the software underlying the principles of operating the system shown in FIG. 2. Specifically, FIG. 3 represents a flow chart diagram of a subroutine for creating a memory model in block 24 of FIG. 2. The subroutine starts in block 100 and from the start proceeds to the block 110 "Examine Operating System or Application" corresponding to block 44 of FIG. 2. In this block 110, the operating system or application under investigation is examined to basically identify the key structures important to the types of checks a user wants to perform, e.g. security essential features of the OS or application.

This operating system or application examination may be performed by an expert who works with elements of the source code for the OS and/or application. Alternatively, if the source code is not available, then an expert works with a running system and a debugger system to identify security essential structures of the memory. For example, considering the attack example presented in FIG. 1, the security relevant object 40, e.g. the address of the process list in the memory is to be identified (either by using a source code or debugging symbols as in the case of the source code absence). Further, another security relevant object 42, e.g. the threads list's address in the memory is to be identified. For both lists, the process list and threads list, a respective code is to be written to traverse the structure. Further, an invariant relationship between these structures, the threads list and the process list, is defined.

For this operation, the flow-chart follows to the block 120 "Find invariant". This invariant relationship between the structures constitutes a basis for a predicate for the threads list and the process list. Therefore, upon finding the invariant property in block 120 for particular structures of the operating system or application, the logic passes to block 140 "Write Predicate to test invariant", where a scripting language is used to represent this predicate. Depending on the OS or application configuration 44, and the security essential structures 40 and 42 to be checked, the number of predicates in the model definition 48 can differ from several to hundreds and thousands.

In block 140, a predicate is written that will test the invariant to ensure that invariant remains unchanged, e.g., in the case of the process list-thread entry list, the invariant is "There should not exist a thread list without corresponding process list entry".

If the invariant is not found in block 120, the logic moves to block 130 "Stop".

From block 140, the logic passes to block 150 "Add Predicate to Model" so that the predicate is added to the block 48 of FIG. 2. The system then loops back to the block 110 to examine the operation system or application for other security relevant objects in the kernel configuration. The model creation process shown in FIG. 3, is carried-out offline before any type of check is performed on the OS or application of interest. The developed model comprises a set of invariants written as predicates for a particular operating system or application along with the ability to extract the image of a running kernel memory and provides the capability of comparison of the runtime invariant property with the "healthy" operating system (application) in the predicate verifier 30.

The monitor 22 may be implemented as a single card, having stored therein the Test Model, which may be coupled to a computer under investigation and which runs automatically to take a "picture" of the running system, to decompose the running system and to compare with the model (specification or set of predicates) to issue a signal indicative of potential violation of the monitored host computer system.

Referring further to FIG. 4, the monitoring of the integrity of the operating system or application is initiated in block 200, from which the logic flows to block 210 "Create Memory Model offline" where the subroutine presented in FIG. 3 is performed. The logic further flows to block 220 "Acquire Memory Image" in which a low level monitor 26, shown in FIG. 2, acquires a memory image of a particular portion of the running kernel 34. The captured memory image can be saved on a disk for later analysis.

The low level monitor 26 has an operating system driver to be discussed further in detail, that captures a memory image using any of the known acquisition techniques. The acquisition technique depends on the residency of the monitor unit 22, which will be detailed in further paragraphs. In the case of the PCI card, the acquisition method is via direct memory access (DMA). In the case of residency in a virtualized partition/domain manager or residency in an onboard co-processor or on-CPU core, the acquisition method is through direct physical memory reads. Additionally, a manual acquisition method may be used where a "picture" of memory is taken via an application and analysis accomplished offline.

Further, upon the memory image having been captured by the low-level monitor 26, the logic information flows to the block 230 "Decompose Image" in which the decomposer 28, shown in FIG. 2, uses the Compiled Model (Memory Model) 52 to extract data representative of the objects 54, 56 of interest corresponding to the model objects 40, 42. Specifically, the decomposer 28 ensures that the structures 54 and 56 of interest correspond to structures 40 and 42 of the OS configuration 44, in order that the constraints applied to structures 40 and 42 of the healthy OS configuration 44 are not applied to the wrong structures of the kernel memory.

The image representation data of the structures 54 and 56 of interest of the kernel memory 34, specifically the state thereof, thus are depicted in the decomposed image block 230. After decomposing the image, the flow chart moves to block 240 "Apply Model to Image" in which the predicates written for the structures 40 and 42 are verified in the predicate verifier 30 for the structures 54, 56 of the running kernel 34 based on image representation data received from the decomposer 28 and the compiled constraints (predicates) 50 received from the specification compiler 38 shown in FIG. 2.

Further, the logic flows to block 250 "Is the Model Correct?". If the assertion (predicate) is correct, meaning that no violation has been detected, the logic loops back to the block 220 to check a next security relevant object of the kernel 34.

If however, the checked assertion (predicate) is invalid, then the logic passes to block 260 "Report the Discrepancy/ Course of Actions" which initiates response mechanisms 32 shown in FIG. 2. The response mechanisms may include an alert administrator action, repairment of the violation if a repair is available, scheduling to run new predicates to collect additional information, such as checking the larger or entire image of the kernel memory 34, or other action to be taken. The provisional check can be performed in a rapid fashion, for instance, the checking on Windows XP of roughly 1,500-1, 800 different predicates can be performed in a time frame less than one minute. The check of the operating system and application in accordance with the present technique may be performed in such a short period of time due to the fact that the system focuses only on the most important security sensitive key features of the kernel memory. Additionally, during the check of the structures, the system does not save states of the structures of the kernel memory. Due to the avoidance of saving the states of the kernel's objects, the system is time and memory space efficient.

If however a problem is identified for a specific security relevant feature of the kernel memory, the picture of the entire memory is snapshot, which generally takes about 4 seconds, and the image is saved to a disk so that the analyst can analyze the entire picture of memory to identify a problem. If the course of action requests that more memory image is to be acquired, the logic loops back to block 220.

As shown in FIGS. 5-8, the present system may be implemented in several modifications to provide detection of malice, configuration compliance, or remote attestation support of digital rights management (DRM).

The key component of the architecture of the system of the present invention is the management engine, entitled and referred to herein as Komoku Management Engine (KME). The KME may reside on special purpose hardware such as Komoku's PCI add-in board (shown in FIG. 5), in a virtualized partition or para-virtualized manner (shown in FIGS. 6 and 7), and a software driver (shown in FIG. 8). In each alternative implementation, an application programmer's interface (API) and management protocol exposed is identical, meaning that the only difference between the implementation platforms of the KME is assurance level of tampering of the KME. The KME software is identical regardless of its platform, and all capabilities are identical as well. The hardware or virtualized KME has a greater assurance from tampering than a software implemented KME.

Figure 5:
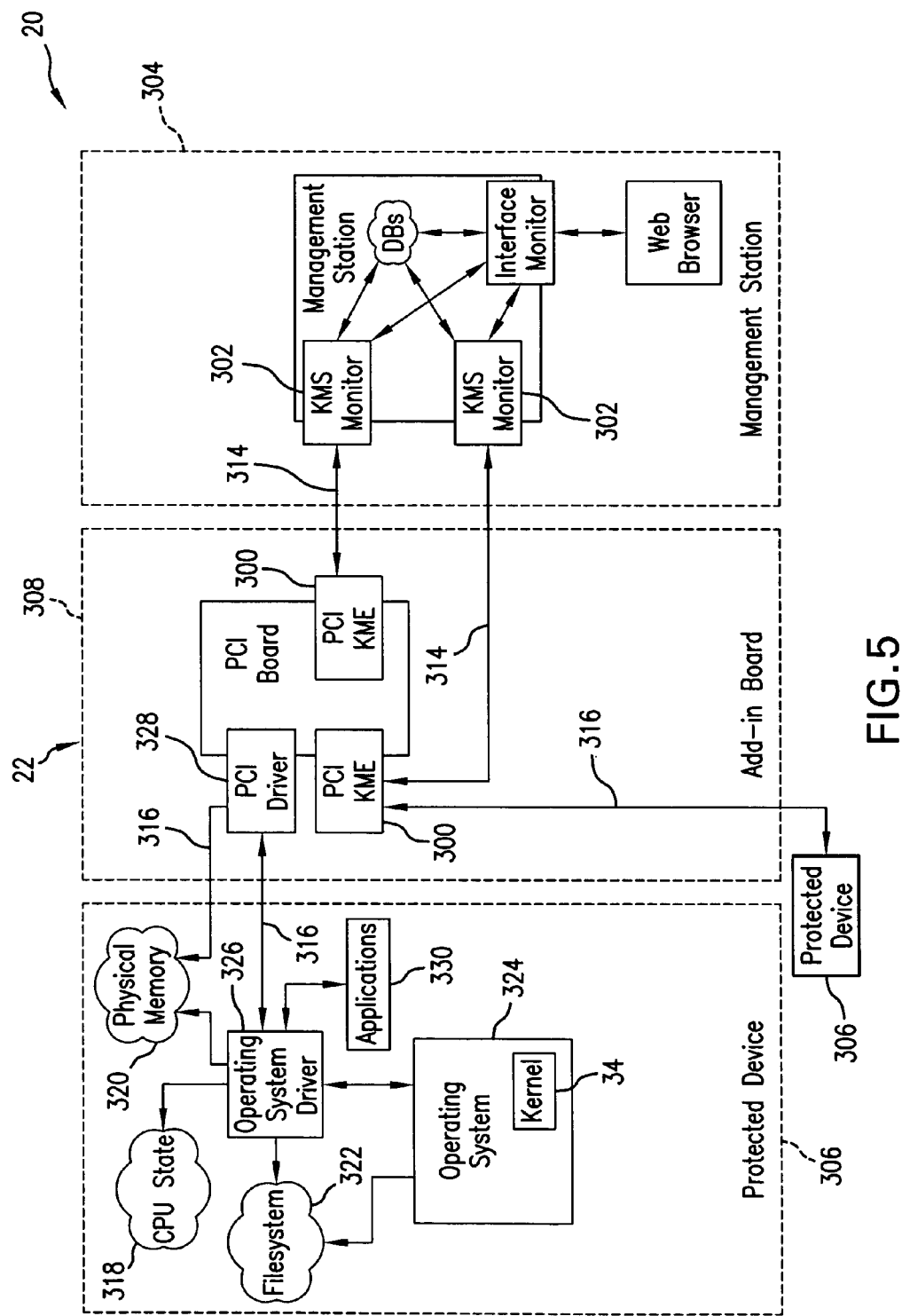
FIG. 5 is a schematic representation of a hardware implementation of the architecture of the present invention.
Figure 6:
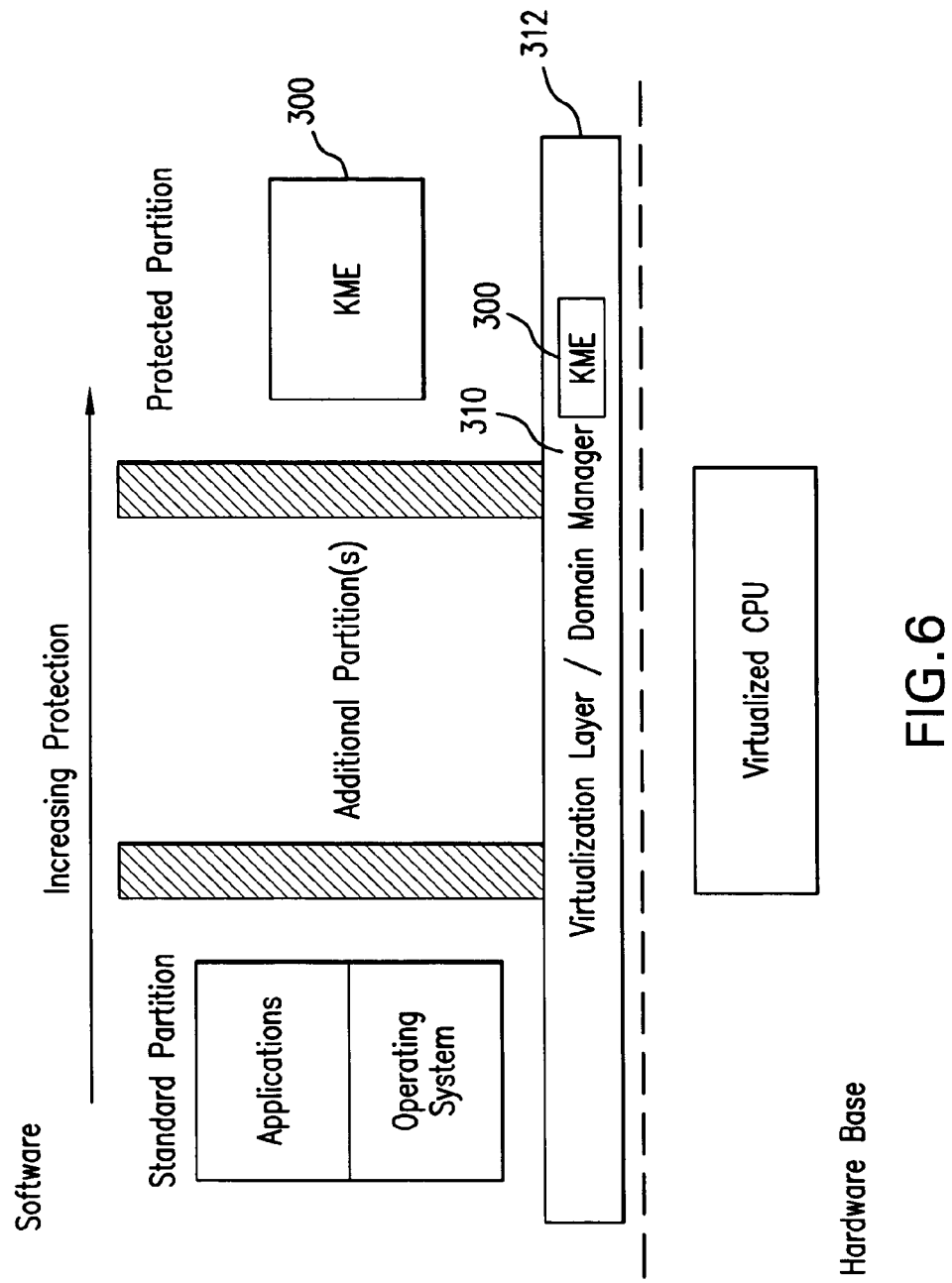
FIG. 6 is a schematic representation of a hardware virtualized implementation of the architecture of the system of the present invention.
Figure 7:
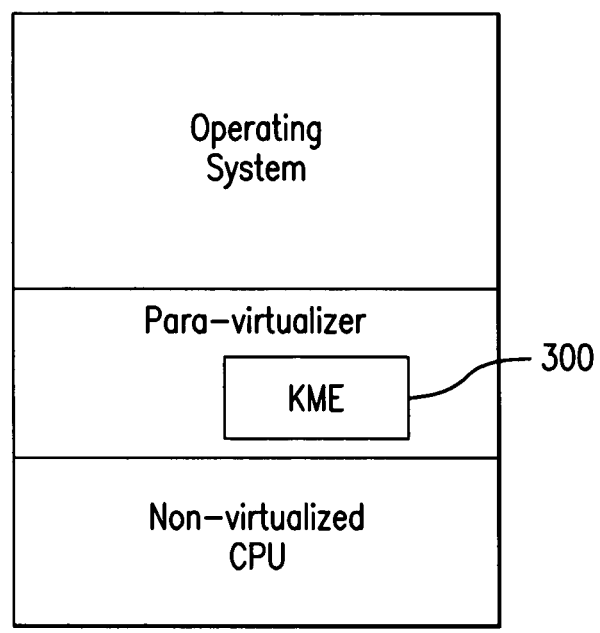
FIG. 7 is a schematic representation of a para-virtualization implementation of the architecture of the present invention.

There are several compelling aspects of the present approach. The first is that the KME may be a resident in a variety of different platforms such as consumer electronics or information systems, each with a variety of assurance levels. For a high assurance solution, a hardware or a virtualized solution is preferred (FIGS. 5-7). For a low assurance at a reduced cost, a software solution (FIG. 8) is sufficient due to the fact that since the KME is "scriptable" (script can be optionally downloaded/updated), the detection and protective capabilities of the KME may change in response to an evolving threat.

The system architecture is composed of two major components, including a monitor (KME) and a Komoku Management Station (KMS) monitor. The KME is a monitor constituting an execution engine, for example a Turing machine, capable of receiving and executing a collection of packages. As presented in previous paragraphs, the KME may run on hardware, or software platform, or in a virtualized environment. The management monitor runs only on the management station and may monitor one or more KMEs. The management station receives and controls events from one or more KMEs through one or more KMS monitors. A single management station can manage multiple KMEs on a variety of protected devices which may have a variety of assurance levels and may be based on completely different platforms, e.g. ARM 9/Linux or IA 386/Windows. This is possible for two reasons: (a) the management station is capable of hosting multiple KMSs; and (b) the predicate API used by all the KMEs is unified, regardless of the CPU or operating system of the protected device. Thus, the system of the present invention is operable in heterogeneous environments.

Each monitor, KME or KMS, is scriptable in a secure monitor language(s), such as for example a C like scripting language. This approach frees a programmer from worrying about proper memory management at the cost of "noise" collection. While the SML is an interpreted language, predicate and packages can be compiled into byte code to reduce size and improve performance. The package herein is considered as a collection of predicates that perform a specific function such as remote attestation, forensic analysis, etc. The predicate is presented as a monitor function that executes within a specific package and conforms to the predicate API. By definition, a predicate returns either true or false along with additional information as needed.

Each KME exposes a set of primitive functions beyond those provided in SML. The primitives are important to providing the independence from the protected operating system and are unique to the KME. The KME does not rely on the API's imposed by the host operating system, but uses physical IO (memory and eventually file system) and register values directly, e.g. without reliance on the OS of the protected device, thus eliminating the undesirable cycle distinct in monitoring systems relying upon the correctness of the protected device operating system.

As an example, an API:

Memory_array GetPMem (Paddr_t address, int size)

returns the physical memory located at address up to address+size in an associative array.

Like most languages, the SML permits a programmer to create libraries and to reuse a code. KME additionally, provides operating system base libraries that use the primitives to expose a more functional API for each operating system and processor pair, for example, the translation of a physical memory address to a virtual memory address.

Libraries are used by simply listing their name in the header of a SML predicate as follows:

include arm9-base.package;

include arm9-linux-base.package;

Monitors communicate via packages and predicates. The KMS sends a package/predicate to the KME via an encrypted TLS link. The KME evaluates the package the package/predicate and returns the response to the KMS.

Shown in FIG. 5, the hardware implementation provides the highest degree of protection from modification by a remote or local end-user of the protected device. This is due to the isolation offered by hardware which is significantly greater than a software only solution. This increased assurance level comes at an increase in installation and procurement costs over a software only solution. These costs, however, are comparable to the purchase of an add-in video graphics board.

The hardware solution is optionally utilized where high assurance is warranted due to a significant threat or value of the protected device or information system. The hardware solution also provides better performance as well as increased network capabilities such as network traffic filtering, network isolation, and network redirection of the protected host. These capabilities are provided due to the dual network interfaces on the add-in card used.

Referring to FIG. 5, the host memory integrity monitoring system includes one or a plurality of protected devices (host system) 306, one or plurality of memory integrity monitors KME 300 of the present system (detailed in FIG. 2 as the monitor 22), and one or a plurality of management monitors KMS 302 of the administrative system which is a management station 304. The protected device 306 is the system which the KME 300 monitors for the presence of violations such as rootkits or other modifications. The protected device 306 may be a desktop PC configured as a server. The management station 304 is the entity comprising one or a plurality of KMS monitors 302 through which an administrator (managing entity) interacts with one or a plurality of the PCI KMEs 300.

The management station 304 may be a laptop work station that is connected to the PCI KME 300 through independent communication links 314 such as, for example, a PCI bus, or faster input-output buses. The independent links 314 permit the KMEs 300 to send reports to the management station 304 without relying upon the possibly compromised protected device 306 for communication. The links 314 also permit that the management station 304 to periodically poll the monitor's KME 300 in order to detect cases where the protected device 306 has been compromised and powered down, or trapped in a cycle of PCI resets that would prevent all of its PCI devices, including the monitors 300, from performing useful work.

The KME monitor 300 has the ability to perform arbitrary checks on system memory, and therefore includes a mechanism to monitor for any number of indications that the kernel is no longer operating in a trustworthy manner. The monitors 300 can perform their audit of system memory kernel for ~30 seconds. This efficiency, combined with the added assurance provided by the monitor architecture, results in a considerable advancement in the protection of commodity operating system's kernels running on community hardware.

In addition to the detection possibilities of the monitors 300, their architecture provides for restoration (partial or complete) of changes due to malicious modifications.

As shown in FIG. 5, the monitor system 22 (KME 300) is based on the add-in card 308 which includes its own processor (not shown), a monitor memory 320, and a serial connection kernel logging and console access by the management station 304. The monitor 20 is attached to the host station (protected device) 306 through an input-output (IO) bus 316 to provide the monitoring function with regard to the protected device 306 through the IO bus 316. The protected device 306 includes a CPU 318, memory 320, file system 322, operating system 324, applications 330, and an operating system driver 326 through which a PCI driver 328 of the monitor system 22 communicates with the resources of the protected device 306 (such as, for example, the CPU state 318, filesystem 322, as needed) by sending requests through the IO bus 316 to retrieve the state of the monitored host(s)' processor(s) to assist in decomposing and verifying routines, as well as to retrieve additional object information from the filesystem 322. The input-output (IO) bus 316 may be implemented with the PCI (Peripheral Component Interconnect) bus, as well as with faster input-output buses.

The kernel 34 is a program that constitutes the central core of the computer operating system 324 and it has control over substantially everything that occurs in the protective device 306. The kernel 34 itself does not interact directly with the user, but rather interacts with the shell in the operating system 324 and other programs, as well as with the hardware devices of the system including the processor 318, memory 320, file system 322, and disc drive (not shown).

The kernel 34 is the initial portion of the operating system 324 to load into the protected area of the memory 320 during booting and remains in the memory for the duration of the computer session. This prevents it from being overwritten by other, less frequently used parts of the operating system 324 or by application programs 330.

The kernel performs its tasks in kernel space of the memory 320 whereas everything a user normally performs is done in user space.

The contents of a kernel vary considerably according to the operating system, but they typically include a scheduler, which determines how the various processes share the kernel's processing time, a supervisor, which grants use of the computer to each process when it is scheduled, an interrupt handler, which handles all requests from various hardware devices that compete for the kernel's services, and a memory manager which allocates the system's address spaces among the users of the kernel's services.

In order to perform its task of monitoring the protected device 306, the monitoring system of the present invention must meet, at a minimum, the following set of requirements:

Unrestricted memory access: The KME 300 must be able to access the system's memory 320, more specifically it must be able to access the full range of physical memory since accessing only a subset is not sufficient.

Transparency: To the maximum degree possible, the KME 300 should not be visible to the host processor 318. At a minimum it should not disrupt the protected device's normal activities and should require no changes to the protected device's operating system or system software.

Independence: The monitoring system should not rely on the processor or the protected device 306 for access to resources including main memory, logging, address translation, or any other task. The monitoring system 20 must continue to function regardless of the running state of the protected device 306.

Sufficient processing power: The monitoring system 20 of the present invention at a minimum must be able to process a large amount of memory efficiently. Additionally, the choice predicate based monitoring technique as a means of integrity protection places on the monitoring system the additional requirement of being able to perform and compare predicate based check as was described in previous paragraphs.

Sufficient memory resources: The monitoring system 20 must contain enough long term storage to maintain a baseline of system state. This summary of a non-compromised protected device is fundamental to the proper functioning of the auditor. Furthermore, the monitoring system 20 must have sufficient on-board non-system RAM that may be used for its own calculations.

Out of band reporting: The monitoring system must be able to securely report the state of the protected device 306. To do so, there must be no reliance on a possibly compromised host device. The monitoring system also must have its own secure channel to the management station 304.

The monitoring system 20 may be operated in several modes. The stand alone operation of the monitoring system shown in FIG. 5, provides for complete independence with regard to the process execution. As with all add-in cards, it is able to be queried by the protected device and reliant on the PCI bus for power. However, in stand alone mode, the monitor is configured to deny all configuration reads and writes from the host processor thereby making its execution path immutable by an attacker on the host.

There are two features of the Linux kernel 34 that enables the monitor KME 300 to locate specific data structures and regions of text within the host kernel's address space: linear-mapped kernel virtual addresses and the absence of paging in kernel memory. The kernel's memory includes virtual subsystem and physical memory subsystem. The linear-mapped kernel virtual address feature enables the monitor KME to locate the regions it must monitor within host kernel memory 34.

When the monitor KME 300 is instructed to examine a region of host kernel memory, it makes a request for that region over the PCI bus 316. Due to the nature of the PCI bus 316 on the PC form, the monitor KME 300 must specify the address of the retrieval region in terms of the host's physical address space. This address, as well as the pointers that KME finds in the retrieved regions themselves, are all represented in terms of the host kernel's virtual address space.

Consequently, prior to making a request on the PCI bus 316, the KME 300 must first translate these host virtual addresses into host physical addresses. The monitor KME or the entire monitoring system 20 makes this translation by retrieving the page tables maintained by the host kernel's virtual memory subsystem DMA and using them to translate addresses in the same manner as the host kernel. This simple linear mapped address translation method is sufficient to retrieve the host kernel text, its page tables, and those data structures statically-allocated in its initialized and un-initialized data segments. However, it is not sufficient for retrieval of dynamically-allocated data structures such as the buffers containing a LKM text. These dynamically allocated data structures reside in a specific region of the host virtual memory. The kernel does not map this virtual address as to physical addresses in a linear manner. Instead, it uses its page tables to maintain a nonlinear mapping. In order to translate this virtual address as to physical addresses, the monitoring system 20 evaluates the host kernel's page tables and performs the translation calculation in the same way as the host kernel.

Due to the linear nature of the address mapping, the monitoring system 20 is guaranteed to find large data structures that span multiple pages in this region of virtual memory stored in an equal number of contiguous page frames in physical memory. However, a single transfer may not be sufficient for large data structures spanning multiple pages in the nonlinear map region of the virtual memory. In this region, the host kernel's page tables may map pages that are contiguous in virtual memory onto page frames that are not contiguous in physical memory. Because of this potential for separation, the monitor 20 must perform separate address translation and DMA transfers for each page of an examination of large data structures in this region.

Referring to response mechanisms unit 32, a human administrator is responsible for taking actions when a report on possible violation arrives. For example, administrators might disregard a report of changes to the host kernel's security module operation vectors if they themselves have just loaded a new security module on the host. A level of automation may be attained by implementing a policy enforcement engine that will permit reports of certain modifications to pass but act upon others as a rootkit activity. Additionally, it is contemplated that the management station may enable centralized and decentralized remote management of multiple networked monitors KME 300.

The monitors are designed to run their checks periodically which may be every thirty seconds by default. A rootkit may conceivably modify and rapidly repair the host kernel between checks as a means of avoiding detection. In order to prevent such evasion tactics from working reliably, the monitor has an added capability to randomize intervals between its checks making their occurrence difficult to predict.

The system shown in FIG. 5, has advantages of implementing a structure integrity monitor on a separate PCI add-in card over traditional approaches which run on a potentially infected host. Because the present monitor software runs entirely on its own PCI add-in card, it does not rely on the correctness of the host that it is monitoring and is resistant to tampering from the host. Consequently, this system shown in FIG. 5 is expected to correctly detect malicious kernel modifications, even on hosts with kernels too thoroughly compromised to allow the correct execution of traditional integrity monitoring software.

The monitor architecture works for both a single, stand alone machine, or within the context of many system environments. Such systems may, or may not, be directly connected via a network. In the multi-system case, the monitor architecture provides for direct or centralized communication and coordination depending on specifics of the environment.

The management station which may also have direct interaction with the monitored devices, push or pull policy and configuration from the monitor itself or from the host that is being monitored. This information ranges from specific configuration parameters to the complete insertion of binary or uncompiled code. Additionally, the capability for interactive control of the monitor KME through the admin station (management station) by a system administrator is explicitly provided. This control may be used to query the system for more information or to make specific changes.

Shown in FIG. 6, is a hardware virtualized implementation of the system of the present invention, in which the KME is currently posted to run under Intel's Vanderpool technology with an assurance level slightly less than the hardware implementation.

The KME is expected to be able to run as a part of a domain manager 310/hypervisor in a virtualization layer 312, or stand-alone in its own partition.

As presented in previous paragraphs, the KME 300 is an evaluation engine designed to acquire a memory image and processor state for the purpose of monitoring scalar and semantic invariants within an operating system or application. The acquired image is decomposed into its relevant objects through the application of the memory mode 52 (shown in FIG. 2). The semantic and scalar integrity is then verified through the assertion of predicates (application of the semantic model 50. The KME 300 may reside in any number of instantiations (or delivery vehicles) such as a coprocessor board, a chipset on the motherboard, a coprocessor (i.e. core on modern CPU's), or in a virtualized CPU environment.

In a virtualized CPU, the processor is partitioned into 2, 3 or more regions, which are multiplexed by a software called Domain Manager 310, thereby forming virtual co-processors operating independently one from another as needed. The KME may reside on the virtual co-processor (region or partition), while the monitored structure, for example, the operating system, may reside on another virtual co-processor (region, or partition).

In this manner, the principles of independent operation of the monitor 300 from the host system is employed, similar to the employment of the embodiment shown in FIG. 5 which uses physical co-processor based monitoring. Advances in solid-state technology, as well as the use of a memory controller for allocating the respective areas of the memory for examination, permits the same degree of isolation between the virtual co-processors as is provided with the physical co-processors.

The monitor 300 may also reside within the Domain Manager 310. In this embodiment, even though the Domain Manager 310 is software responsible for multiplexing of the CPU, it provides the virtual co-processor (region) for itself as well.

As shown in FIG. 6, the KME 300 is resident in the domain manager 310 or a virtualization layer 312. When the KME is resident in virtualization layer 312, the KME begins operation at the same time as 312. The KME has full access to the processor's state for each virtualized partition, and the host's RAM.

In the case where the KME 300 is resident in a protected partition, there are several ways to begin operation. The first is when block 312 spawns a new virtualized partition. In this case, the domain manager (block 310) starts operation first and spawns virtualized partitions containing an OS or other applications as needed. A second case is when an existing partition spawns a new partition. In this second case, block 312 still begins operation prior to any protected partition.

Another method is when the operating system to be monitored actually spawns a domain manager containing a KME after boot. In this case, the monitored operating system is not initially running in a virtualized environment. However, a device driver or sufficiently privileged application (possibly working with a device driver) issues a series of instructions to enable the virtualization capabilities of the real underlying processor and create a protected partition containing a KME. This process dynamically creates block 312 and slides it under the running operating system. This allows a virtualized environment to be created when one was not present at boot time.

In each of the three cases above, the KME block 300 operates identically. When the KME is resident in a virtualized partition, block 312 must provide the proper instructions to protect the partition in which the KME resides, and allow the KME to access the state of the monitored partitions.

The domain manager 310 is a type I virtual machine monitor (VMM), e.g., it runs directly on top of the hardware without the need for a host operating system.

Virtualized CPU means that the CPU meets the requirements to support a Type I VMM. These requirements are:

1. The method of executing non-privileged instructions must be roughly equivalent in both privileged and user mode.

2. There must be a method such as a protection subsystem or an address translation system to protect the real system and any other VMs from the active VM.

3. There must be a way to automatically signal the VMM when a VM attempts to execute a sensitive instruction. It must also be possible for the VMM to stimulate the effect of the instruction.

Sensitive instructions include:
   a. Instructions that attempt to change or reference the mode of the VM or the state of the machine.
   b. Instructions that read or change sensitive registers or memory locations.
   c. Instructions that reference the storage protection system, memory system, or address relocation system.
   d. All I/O instructions.

Shown in FIG. 7, is a para-virtualization implementation of the system of the present invention, which, unlike hardware virtualization, requires that the domain manager trap a small set of processor instructions. This is due to the fact that the processor, in many cases is not designed with virtualization in mind. Non-virtualized CPU means that the CPU does not meet the requirements for a Type I VMM, and therefore, the virtualization layer must simulate and protect against sensitive instructions. FIG. 7 depicts the KME (block 300) running on hardware that does support a type I VMM. In this case, the para-virtualizer provides the same support as block 310/312 of FIG. 6 in addition to modifications to mitigate against sensitive but unprivileged instructions. The KME (block 300) operates identically to that in FIG. 6.

The para-virtualizer, however, must start prior to any virtualized partitions. For example, Xen on non-VT Intel processors are examples of para-virtualization. Xen, however, seeks to allow multiple partitions, e.g. operating systems, to run simultaneously. For performance reasons, it is possible to run one partition or operating system above the domain manager, when the KME is placed within the domain manager. Para-virtualization combined with a secure bootstrap provides a good balance between security, performance, and deployment costs.

Figure 8:
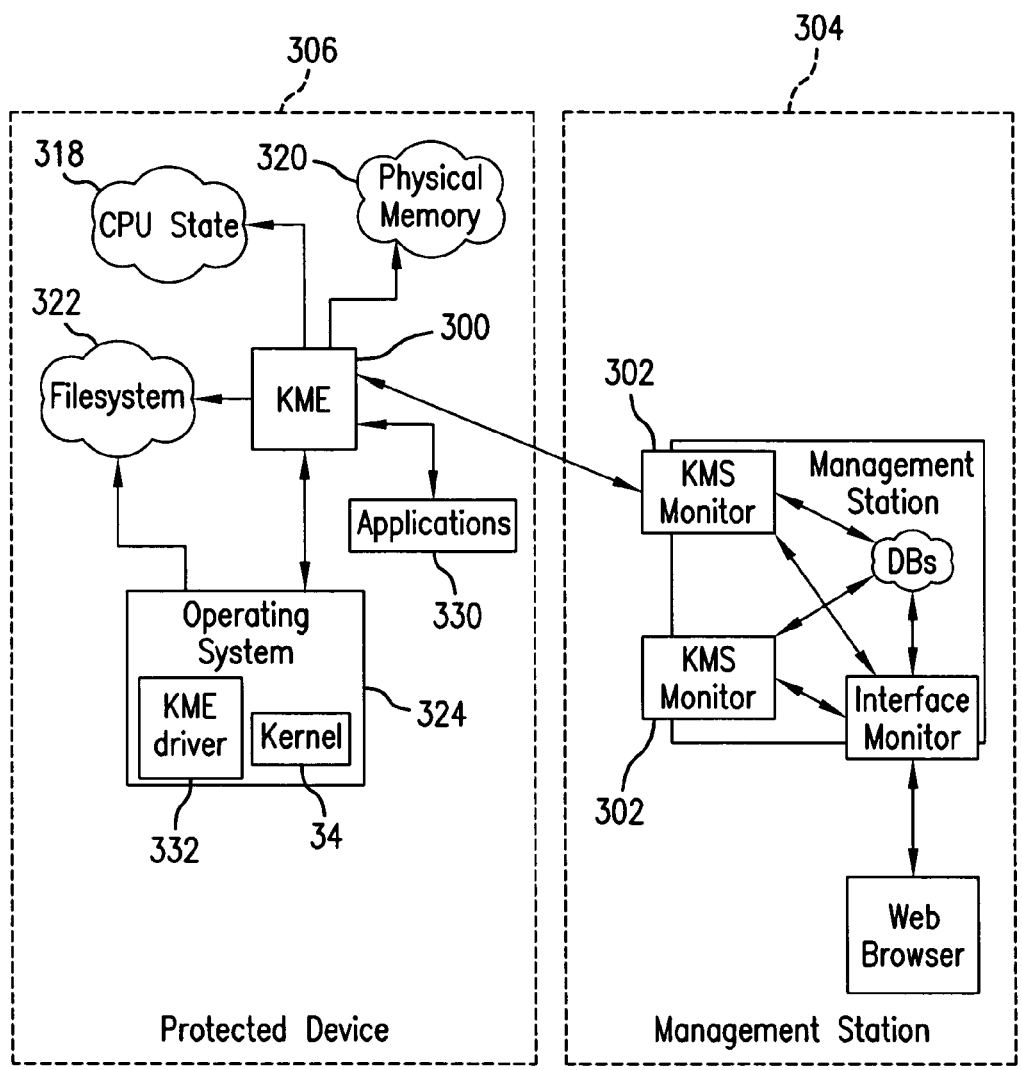
FIG. 8 is a schematic representation of the software implementation of the monitor system of the present invention.

Shown in FIG. 8, a software implementation of the system of the present invention working as a KME driver 332 within the host operating system. The KME 300 exports the exact same API as in the previous modifications of the system. As a result, all predicates written for the same processor, run similarly on a software version as it would in a virtualized or hardware version. However, since the driver is a sub-system of the protected operating system, an adversary can tamper with the driver. Therefore, the software version is not efficient where the results returned from the KME must be trusted in all cases.

FIG. 8 depicts how the KME 300 can be used within a standard operating system to monitor the "health" of the operating system 324. The KME driver 332 provides access to the resources required by the KME to perform its analysis. These resources are:

Physical Memory 320, which is a required resource where the memory image is acquired;

CPU state 318, being a required resource which provides the state of the registers for the monitored system. The register values serve as indicators of where to perform analysis;

Filesystem 322, which is not required information, however, is useful for some predicates to have access to the filesystem to verify invariants between memory objects and file system objects.

The KME 300 queries the KME Driver 332 for resources to perform its semantic integrity analysis. This information is used to verify not only the operating system 324, including the kernel 34, but also the applications 330.

The KME 300 receives its predicates and policies from the management station 304, that is managing one or more KME's, and the KME reports results to the management station, where the KMS monitor 302 is simply a translation device for inserting the results of commands into a historical database for later analysis via an interface monitor which may be a command line application, a local application providing a user interface, or a web browser.

Performing attestation is made simple within the architecture of the inventive system: a predicate is written in SML to perform any configuration checks for attestation, and the result is returned to the KMS. The assurance level of the result will obviously depend on the assurance level of the KME. That is a result returned from a hardware based KME will have a much higher assurance level than a software only based KME.

The attestation, as any predicate, may be scheduled synchronously or asynchronously, and is performed transparently with no operating system or application changes.

The typical use of the KME is to check the configuration of a running system. A KME may, however, be programmed to check content synchronously via an integrated application prior to various user actions such as transferring or opening content.

To respond to detected possible violation, there are several options available for the management entity, such as to enter into a business logic to decide whether more forensic information is needed to be collected, the machine is to be shut down, or another type of monitoring is to be applied to the examined structure which has been modified.

Another option available for the management entity is to repair the damage made to the examined structure. The present system monitors invariance of the host kernel objects, the recovery process being substantially the inverse of the monitoring process. To repair the damage, the system writes rather than reads the invariant back to its proper location.

Either implemented on a separate PCI add-in card as shown in FIG. 5, which communicates with the host device 306 via the PCI local bus, or the monitor positioned on the motherboard of the host system as shown in FIG. 8, or in the virtualized implementation shown in FIGS. 6 and 7, or in the arrangement where the monitor KME resides on one of the virtual CPU while the monitored system resides on another virtual CPU, multiplexed by the domain manager, shown in FIG. 6, the monitor of the present invention demonstrates the advantages of the monitoring of the integrity of host resources of interest (such as operating systems, applications, domain manager, etc.) since the monitor software runs entirely in isolation and separated from the host monitored structure, and thus does not rely on the correctness of the monitored host.

This monitoring technique is resistant to tampering from the host. Consequently, the novel monitoring system can correctly detect malicious modifications to memory, kernel, overall operating system, applications, domain manager, etc., even on hosts with operating systems too thoroughly compromised to allow the correct execution of traditional integrity monitoring software. The monitoring system of the present invention does not require any modifications to the host's software and can therefore be applied to commodity systems.

Although the invention has been described herein in conjunction with specific embodiments thereof, many alternatives, modifications, and variations will be apparent to those skilled in the art. The present invention is intended to embrace all such alternatives, modifications, and variations that fall within the spirit and broad scope of the appended Claims.

What is claimed is:

1. A method for monitoring the integrity of a running host computer system, comprising:
   (a) coupling at least one monitor unit having a direct access to at least one monitored structure of a running host computer system and operating independently therefrom, said at least one monitored structure having at least two security relevant objects, including a first security relevant object and a second security relevant object, characterized by an invariant property associated therewith, wherein the invariant property includes a relationship between the first security relevant object and the second security relevant object;
   (b) creating a Test Model including at least one semantic predicate descriptive of said invariant property of said at least two security relevant objects of said at least one monitored structure known-to-be unviolated, wherein a semantic predicate comprises a description of the invariant property associated with the at least two security relevant objects and the description is independent of any stored data;
   (c) loading said Test Model into said at least one monitor unit to be executed therein;
   (d) acquiring a memory image of at least a portion of said at least one monitored structure of said at least one monitor unit;
   (e) decomposing, under said Test Model control, said acquired memory image to extract therefrom a representation of said at least two security relevant objects of the running host system;
   (f) verifying, by evaluating said invariant property associated with said at least two security relevant objects of the running host system; and
   (g) issuing a signal indicative of a violation of said invariant property of said at least one security relevant object of the running host system when a discrepancy from said invariant property has been detected.

2. The method of claim 1, further comprising:
   establishing a monitoring system, said monitoring system including:
   at least one said monitor unit for monitoring the integrity of said at least one monitored structure of the running host computer system, said at least one monitor unit operating independently of said at least one monitored structure, and
   at least one management system;
   coupling said at least one management system to said at least one monitor unit through a communication link independent of said at least one monitored structure;
   loading, in said step (c), said Test Model from said at least one management system into said at least one monitoring unit;
   transmitting said signal issued in said step (g) to said at least one management system;
   analyzing said transmitted signal at said at least one management system; and
   formulating a course of actions including at least one action selected from the group consisting of: skipping the action, acquiring a memory image of the entire monitored structure, collecting forensic information, and repairing of a modification detected in said invariant property.

3. The method of claim 2, wherein said at least one monitor unit is based on a co-processor different than the processor of said running host computer system, the method further comprising:
   connecting said at least one monitor unit to said running host computer through an input-output (IO) bus of said host computer system, and
   making a Direct Memory Access (DMA) request for said at least one security relevant object over said IO bus.

4. The method of claim 2, where the step of creating the Test Model further comprises:
   (h) examining a configuration of said at least one monitored structure of said host computer system,
   (i) identifying said at least one security relevant object of said monitored structure, and defining attributes of said at least one security relevant object, including an address thereof,
   (j) defining said at least one invariant property for said at least one security relevant object, thereby forming said at least one predicate, said at least one invariant property being selected from a group consisting of the object value and relationship in the other security relevant objects, said at least one invariant property remains unchanged if said running host computer system is problem free,
   (k) forming said Test Model including said at least one predicate and said defined attributes of said at least one security relevant object,
   (l) repeating said steps (h)-(k) for a plurality of security relevant objects of said at least one monitored structure; and
   (m) storing said predicates and said attributes for said plurality of security relevant objects to said Test Model to form integrity test specification.

5. The method of claim 4, further comprising:
   in (b), defining a policy unit including a set of directions to said at least one monitor unit to actuate at least one predetermined action in said monitoring system when a predetermined condition exists.

6. The method of claim 4, further comprising:
compiling said integrity test specification, and
in (c), loading said compiled integrity test specification into said at least one monitor unit.

7. The method of claim 1, further comprising:
accessing by said at least one monitor unit said at least one monitored structure selected from a group consisting of: CPU, main memory, operating system, kernel, static kernel memory, semi-static kernel data, dynamic kernel data, an applications system, domain manager system, processor state resources, and filesystem resources of said host computer system.

8. The method of claim 7, further comprising:
accessing said filesystem resources to retrieve an additional information on said at least one security relevant object.

9. The method of claim 7, further comprising:
accessing the CPU of said running host computer system to retrieve the state of said CPU to assist in said decomposition and verification.

10. The method of claim 1, further comprising:
arranging said at least one monitor unit as a single-board computer of a Peripheral Component Interconnect (PCI) add-in card, and
attaching said add-in card to an input-output bus of said at least one running host computer system.

11. The method of claim 1, wherein said at least one monitor unit is based on a co-processor, the method further comprising:
locating said at least one monitor unit on the motherboard of said at least one host computer system, and
coupling said at least one monitor unit to said at least one monitored structure via a local bus.

12. The method of claim 1, further comprising: acquiring said memory image and executing said Test Model periodically and/or at randomized time intervals.

13. The method of claim 1, further comprising monitoring, by said at least one monitor unit, dynamic kernel data of said host computer system.

14. A method for monitoring the integrity of a running host computer system, the method comprising:
partitioning the processor of said running host computer system into at least a first and a second processor regions, said at least first and second processor regions representing virtual co-processors independent each from the other;
coupling at least one monitor unit having a direct access to at least one monitored structure of the running host computer system and operating independently therefrom, said at least one monitored structure having at least two security relevant objects characterized by an invariant property associated therewith, wherein the invariant property includes a relationship between each of the at least two security relevant objects, and wherein said at least one monitor unit is located on said at least first processor region and said at least one monitored structure is located on said at least second processor region;
creating a Test Model including at least one predicate descriptive of said invariant property of said at least one security relevant object of the at least one monitored structure known-to-be unviolated;
loading said Test Model into said at least one monitor unit to be executed therein;
acquiring a memory image of at least a portion of said at least one monitored structure of said at least one monitor unit;
decomposing, under said Test Model control, said acquired memory image to extract therefrom a representation of said at least two security relevant objects of the running host system; and
verifying, by implementing said at least one predicate, said invariant property of said at least two security relevant objects of the running host system.

15. The method of claim 14, further comprising:
spawning said at least first and second processor regions by a Domain Manager System.

16. The method of claim 14, further comprising:
spawning said at least second processor region by said at least first processor region.

17. The method of claim 14, further comprising:
operating the operating system of said running host computer system in a non-virtualized environment at a boot time,
instructing said operating system to enable virtualized partitioning of said processor to spawn said at least first processor region, and
locating said at least one monitor unit in said at least first processor region.

18. The method of claim 17, further comprising:
creating a Domain Manager System in said at least first processor region, and
locating said at least one monitor unit in said Domain Manager System.

19. The method of claim 14, further comprising:
multiplexing said host computer system's processor by a Domain Manager system to partition said processor into said first and second processor regions, and at least a third processor region,
allocating said at least third processor region to said Domain Manager system, and
residing said at least one monitor unit within said Domain Manager system.

20. A system for monitoring the integrity of a host computer system, comprising:
at least one monitor unit having a direct access to at least one monitored structure of the running host computer system and operating independently therefrom, said at least one monitored structure having at least two security relevant objects, said at least two security relevant objects having an invariant property associated therewith, wherein the invariant property includes a relationship between the at least two security relevant objects, said at least one monitor unit including:
(a) a low level monitor having a direct access to said at least one monitored structure and acquiring therefrom a memory image of at least a portion of said at least one monitored structure,
(b) a decomposer unit coupled to said low-level monitor to extract from said memory image a representation of each of said at least two security relevant objects of said at least one monitored structure,
(c) a predicate verifier unit connected to said decomposer unit to receive therefrom data representative of said at least two security relevant objects, and inspecting said at least two security objects to verify whether said invariant property associated with said at least two security relevant objects remains unchanged, and
(d) a response mechanism unit coupled to said predicate verifier unit to receive a signal therefrom indicative of a violation of said invariant property, if detected; and
a Test Model including at least one semantic predicate descriptive of said invariant property of said at least one security relevant object and its attributes, said Test Model being applied to said decomposer and said predicate verifier units to extract from said acquired memory image said representation of each of said at least two security relevant objects and to verify said invariant property thereof, wherein a semantic predicate comprises a description of the invariant property and the description is independent of any stored data.

21. The system of claim 20, further comprising at least one management system coupled to said at least one monitor unit through a communication link.

22. The system of claim 21, wherein said Test Model is formed at said at least one management station, and wherein said management station includes:
- a policy and constraints definition unit,
- a model definition unit containing said at least one predicate,
- a specification unit coupled to said policy and constraints definition unit and said model definition unit and forming at least one test specification based on contents thereof,
- a configuration examining unit for examining a configuration of said at least one monitored structure,
- a specification compiler coupled to said configuration examining unit and said specification unit to output a compiled specification constituting said Test Model.

23. The system of claim 20, wherein said at least one monitored structure is selected from a group consisting of: CPU, main memory, operating system, applications system, kernel, Domain Manager system, statically-allocated data, dynamically-allocated data, semi-static data, process state resources, and filesystem resources of said host computer system.

24. The system of claim 20, wherein said at least one monitor unit is based on a processor structure selected from the group consisting of:
- a co-processor physically different than the processor of said host computer system;
- a first virtual co-processor in said host computer system, while said at least one monitored system resides on a second virtual co-processor;
- in a Domain Manager System residing on an isolated region of the processor of said host computer system including at least first, second and third co-processors multiplexed by said Domain Manager Systems.

25. The system of claim 20, wherein said at least one monitor unit resides on a structure selected from a group consisting of: a Peripheral Component Interconnect (PCI) add-in card, and a motherboard of said host computer system.

* * * * *